United States Patent [19]

Rabotski

[11] 4,456,443
[45] Jun. 26, 1984

[54] MACHINE FOR STEAM CHEST MOLDING OF FOAMED MATERIAL

[75] Inventor: John Rabotski, Sheboygan, Wis.
[73] Assignee: Design Engineering Service Inc., Sheboygan, Wis.
[21] Appl. No.: 444,794
[22] Filed: Nov. 26, 1982
[51] Int. Cl.³ .............................................. B29D 27/00
[52] U.S. Cl. .................... 425/4 R; 249/66 R; 249/79; 249/158; 249/161; 249/167; 264/40.5; 264/40.6; 264/45.5; 264/53; 264/101; 264/DIG. 10; 425/143; 425/149; 425/406
[58] Field of Search .................. 264/51, 53, 124, 40.5, 264/40.6, DIG. 10, 101; 425/4 R, 406, 143, 149; 249/66 R, 79, 158, 161, 167

[56] References Cited

U.S. PATENT DOCUMENTS

| | | | |
|---|---|---|---|
| 2,041,377 | 5/1936 | Schwarz | 264/124 |
| 2,066,993 | 1/1937 | McCombs | 264/124 X |
| 2,250,697 | 7/1941 | Bassett | 264/124 |
| 2,453,568 | 11/1948 | Calleia | 264/124 X |
| 3,264,381 | 8/1966 | Stevens | 264/45.5 X |
| 4,272,469 | 6/1981 | Smith | 425/4 R |

FOREIGN PATENT DOCUMENTS 7614289 6/1978 Netherlands ..................... 425/4 R Primary Examiner—Philip E. Anderson
Attorney, Agent, or Firm—Andrus, Sceales, Starke & Sawall

[57] ABSTRACT

A machine for molding sheets of foamed material includes an upright stationary steam chest having opposing perforated external faces, and a pair of movable assemblies abuttable with the opposite faces of the steam chest to define mold cavities therewith. Each cavity forming assembly includes a mold frame extending normal to a face of the steam chest, and a platen positioned within and coupled to the mold frame. Jackscrews move each mold frame into and out of abutment with the steam chest, and also move each platen relative to its respective mold frame toward and away from the steam chest. A method of molding sheets of foamed material is also disclosed wherein heated polystyrene beads are squeezed by the movable platens to a predetermined thickness to provide a board having the desired dimensions and density.

9 Claims, 12 Drawing Figures

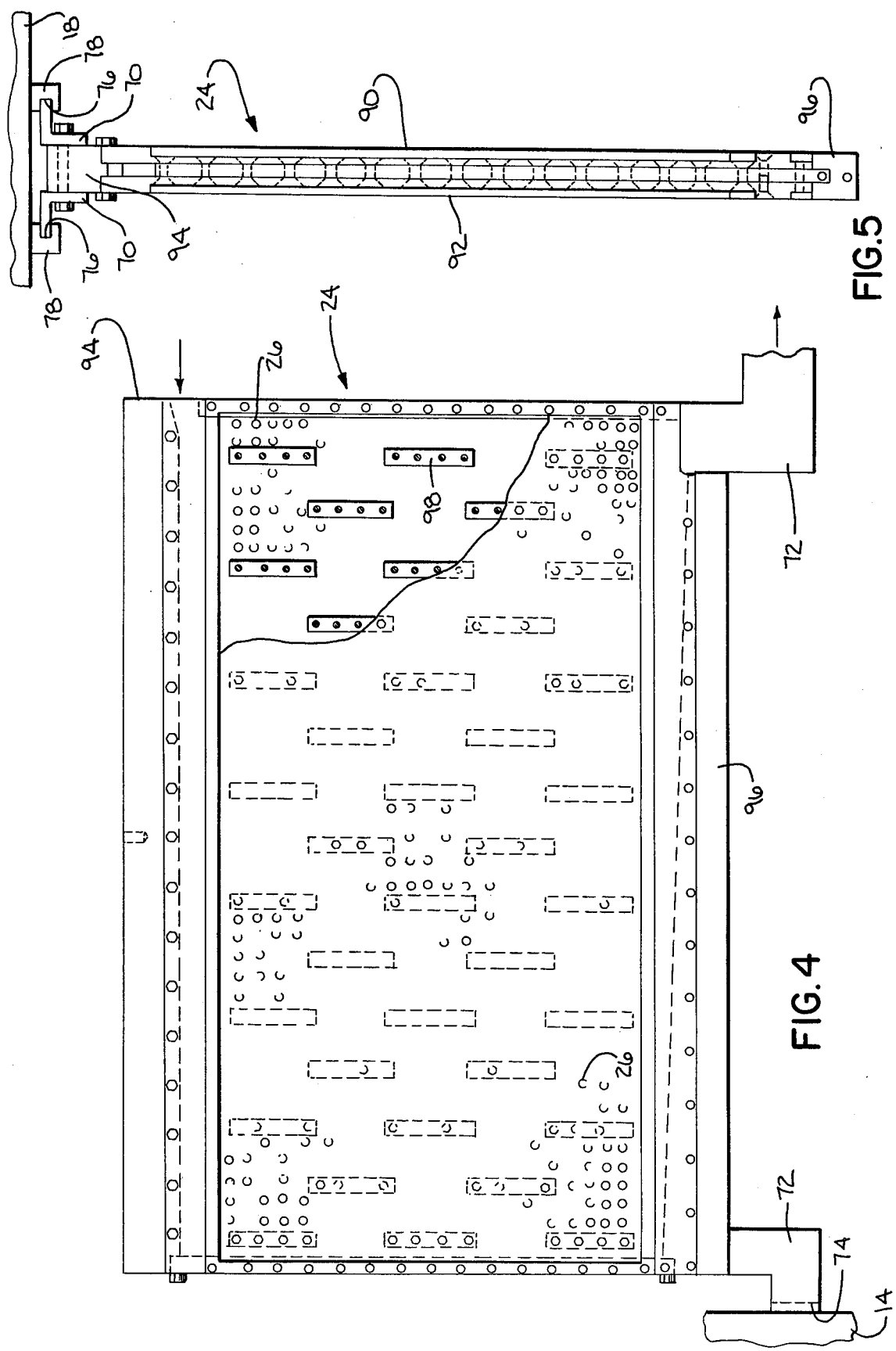

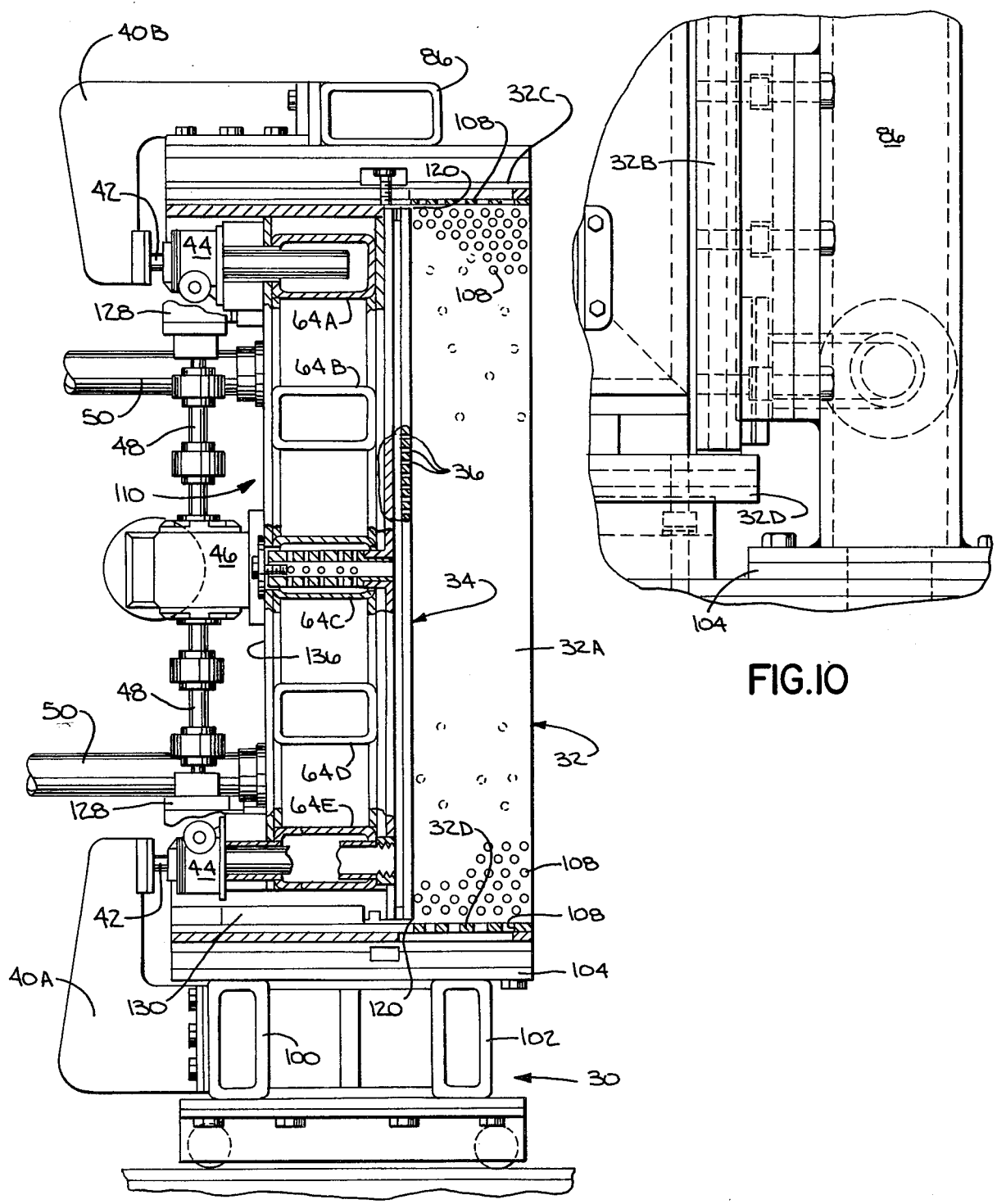

MACHINE FOR STEAM CHEST MOLDING OF FOAMED MATERIAL

BACKGROUND OF THE INVENTION

1. Field of the Invention

The present invention relates to molding articles from expanded foam material, and more particularly to an apparatus and method for making foamed boards or sheets.

2. Description of the Prior Art

Foam material, such as foamed polystyrene, possesses low heat transfer characteristics and other desirable properties because of its cellular structure. As a result, it finds use in a wide variety of applications, including use as an insulating material in the construction field. For such use it is desirable to employ large sheets of foam material having the same size as the plywood sheets, gypsum board sheets, and other materials used in the building trades.

Several types of machines have been developed for manufacturing or molding foam boards and reference should be made to U.S. Pat. No. 3,042,967 for a description of basic foaming techniques. One such type of machine typically has a stationary frame member forming a molding cavity of appropriate dimensions. A cover fits over the cavity and is locked on the stationary frame member. Thereafter, the cavity is filled with partially expanded beads of polystyrene and steam is supplied to the cavity to expand the beads to their completely foamed state. The foam is then stabilized to form a board by cooling it with water. Finally, the board is ejected by a plurality of knock-out plungers from the mold cavity and the machine recycled. The foam material boards produced are typically 4'×8' sheets having a thickness ranging from about 1" to 6".

Another type of molding machine is shown in U.S. Pat. No. 4,272,469. This machine includes a pair of platens fixedly mounted on a frame, and a second pair of platens which are movable toward and away from the stationary platens. In this manner the volume of the mold cavities may be varied to provide the desired board thickness.

Numerous problems have arisen in connection with machines currently in use. The heat of the steam used to expand the beads also expands the metal components of the machine. The design and construction of current machines is such that such expansion interferes with the operation of the machine or generates stresses leading to damage or failure of machine components. Thermally induced alterations of the machine and its components may also adversely effect the quality of the board. For example, the surfaces of the mold cavity may become wavy as they expand producing a board that is similarly uneven.

The forces produced by the steam in the cavity and the release of the blowing agent from the styrene beads may easily exceed 100,000 lbs., similarly causing misalignment, deflection, or fracture of various components of the machine. The so-called "lock-ups" that secure the cover to the stationary frame of many machines are particularly subject to damage or failure in resisting or relieving these pressures.

In the molding process, it is conventional to initially pre-expand the raw polymeric particles or "beads" by the application of heat to form "pre-puffs" prior to their further expansion in a molding cavity into the final board. It has been found that pre-expansion of the beads results in a more uniform final expansion, better fusion of the foam, the elimination of voids in the foam, and lower molding pressures. In addition, it has been found that the density of the final board may be more readily controlled by controlling the density of the pre-puffs. Although many pre-expansion techniques have been developed, it is extremely difficult to reproduce identical physical characteristics, especially density, in the beads from batch to batch so that a uniform final board may consistently be manufactured. This poor expansion control is the result of variances in the raw polymer material itself, the content of the blowing agent used with the bead, and the moisture in the environment. Thus, it is desirable to eliminate the need for precise pre-expansion controls.

A molding machine must also be capable of high production cycles for economic reasons. In order to accomplish this, the cycle time between filling the mold cavity and ejecting a finished board must be kept at a minimum. In the past, machine operators have determined an optimum cycle time, and in particular the cooling period, by a trial and error technique. The optimum cooling time must be determined so that the board is properly cured or dimensionally stable when ejected, and so that unnecessary cooling is eliminated which conserves utilities and reduces manufacturing costs. If not cooled enough, the center of the board will continue to expand after ejection from the mold causing it to take on a bloated configuration. On the other hand, if cooled too long unnecessary water usage occurs raising costs, and cycle times increase reducing production rates. It is thus desirable to provide a molding machine with means for eliminating the guesswork in determining the optimum molding cycle.

Poor cooling techniques have also been a problem. Air pockets may form which prevent cooling water from reaching certain surfaces of the board, especially its corners, resulting in the formation of a non-uniform skin and scorching of the board surfaces. It is thus desirable to provide a molding machine with means for preventing corner air pockets from forming to provide uniform cooling of the board.

Another problem involves removal of the board from the mold cavity once the board has been formed. The board is often wedged in the mold cavity because of the expansion of the styrene beads. As the board is pushed from the cavity by the plungers it may become arched and fly out uncontrollably, or the plungers used to eject the board from the cavity may puncture the board.

SUMMARY OF THE INVENTION

An improved apparatus and method for molding sheets of foamed material, such as polystyrene foam. The apparatus provides a mold cavity defined by a stationary steam chest, a mold frame movable into and out of abutment with the steam chest, and a platen coupled to the mold frame and movable relative to the mold frame toward and away from the stationary steam chest. Jackscrew means are utilized to move the mold frame and platen. The mold cavity is thus easily adjustable to a wide range of board thicknesses, namely, up to about eight inches thick. The use of jackscrew means also avoids the use of "lock-ups" and "knock-outs" with their attendant failures and malfunctions.

The apparatus is economical in use, versatile in operation, and rugged in construction. In part, the economy of the present machine stems from the use of the mold frame, platen and steam chest for the machine as manifolds for the steam and water required in producing foam board. This reduces or eliminates much of the external piping heretofore found in such machines. The versatility of the present machine includes the ability to discharge the completed board either out the side or out the bottom of the machine. This lends flexibility to the positioning of the conveyors carrying away the finished board from the machine. The present machine also lends itself to modular construction in groups of side-by-side machines. The mechanical ruggedness arises from the use of a common steam chest and the avoidance of shear or other forces in the machine.

In the present machine, the movable mold frame and platen are supported from the bottom on a carriage having rollers. This arrangement permits the machine components to expand freely upon heating the mold cavity without generating potentially damaging stresses in the machine.

The present machine also provides proper cooling of the mold cavity by eliminating air pockets from forming in the machine components. In particular, fluid diverter means is connected to the water inlet of the platen which directs the cooling water upwardly upon entering the platen to eliminate corner air pockets.

The present molding machine also eliminates the guesswork in determining the optimum molding cycle, which was heretofore the common method in such machines. Temperature sensors detect the rise in temperature of the cooling water and the steam chest, platen and mold frame during the cooling cycle so that lack of any significant increase in temperature indicates that the board is stable or cured. This also conserves water usage since the mold is cooled only as long as necessary to provide a stable board. Pressure sensors detect the pressure created by the release of the blowing agent in the mold cavity and assures that the board is no longer releasing any significant amounts of the blowing agent prior to opening the mold.

The present invention also provides a method of molding sheets of foamed material. The method includes the step of squeezing the foamed beads while the beads are in a fusable heated state in the mold to a predetermined thickness dimension to fuse the beads into an integral foamed mass. This squeezing step provides for precise control of the density of the finished product, and eliminates the need for precise pre-expansion controls.

The present invention thus provides an improved apparatus and method for rapidly molding high quality sheets of foamed material.

BRIEF DESCRIPTION OF THE DRAWINGS

The drawings illustrate the best mode presently contemplated of carrying out the invention.

In the drawings:

FIG. 4 is a front view with parts broken away of the steam chest;

FIG. 5 is an end view in elevation of the steam chest of FIG. 4;

FIG. 6 is a side view in elevation with parts broken away and in section of one of the cavity forming assemblies of the machine;

FIG. 10 is a fragmentary view showing the configuration of the side walls of the cavity forming assemblies and the piping therefor;

DESCRIPTION OF THE PREFERRED EMBODIMENT

THE MACHINE

Figure 1:
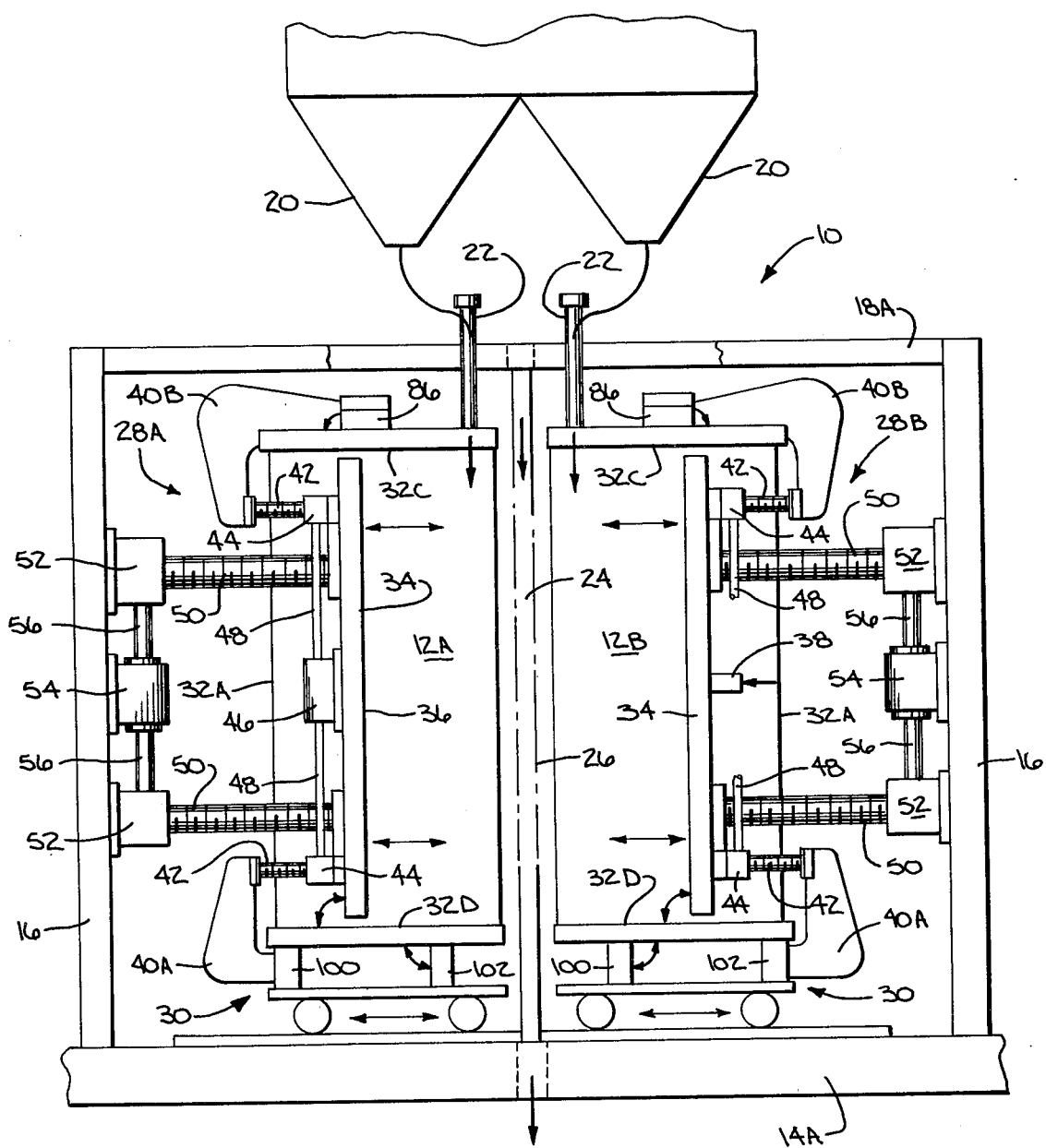
FIG. 1 is a side view of the improved machine for manufacturing foam boards of the present invention in schematic form to illustrate the basic components and principles of operation of the machine.

FIG. 1 shows foam board machine 10 of the present invention in simplified form to present a basic overview of its construction and principle of operation. Machine 10 has two mold cavities 12A and 12B for forming foam material articles, such as foamed polystyrene boards. Machine 10 includes lower and upper supporting frames each having spaced longitudinal members. One of the longitudinal members of the lower frame is shown as 14A in FIG. 1 and the other as 14B in FIG. 3. Columns or abutments 16 are mounted on frame members 14 to position the upper longitudinal members, one of which is shown as 18A. The upper longitudinal members 18 support bins 20 containing pre-expanded polystyrene beads for supply to machine 10 through air-operated fill guns 22.

A centrally located, vertical steam chest 24 is fastened between upper and lower longitudinal members 18 and 14. Steam chest 24 comprises a pair of spaced plates containing a plurality of holes 26 through which water and steam can pass. Holes 26 are sufficiently small that the polystyrene beads cannot pass through them. Steam chest 24 is connected by appropriate plumbing for the supply and discharge of steam, water, and vacuum.

Machine 10 includes two cavity forming assemblies 28A and 28B that are movable into and out of engagement with common steam chest 24 on opposite sides thereof, to form the cavities 12A and 12B in which the polystyrene beads may be expanded to a finished board of foamed material. As both assemblies 28A and 28B are identical, only one is hereinafter described in detail.

Assembly 28A includes a carriage 30 which rolls on lower frame members 14 toward and away from steam chest 24. A mold frame 32 having four side walls is mounted on carriage 30 to define the perimeter of the mold cavity. The side walls include a pair of spaced vertical walls 32A and 32B joined at the ends by a pair of spaced upper and lower horizontal walls 32C and 32D. The walls are hollow to receive heating and cooling mediums, such as steam and water.

A vertical hollow platen 34 is positioned inside mold frame 32 to complete the assembly 28A. Platen 34 contains holes 36, similar to holes 26 in steam chest 24, and is supplied with steam and water through an inlet 38, shown for assembly 28B on the right hand side of FIG. 1.

A pair of L-shaped bracket members 40A and 40B have one leg fixed to frame 32 and a second leg facing platen 34. Jackscrews 42 are fastened to L-shaped members 40 and extend through rotating nuts within housings 44 mounted on platen 34. The nuts within housings 44 are rotated by motor 46 through shafts 48. The operation of jackscrews 42 determines the position of platen 34 along mold frame 32.

Jackscrews 50 extend between platen 34 and rotating nuts in housings 52 fastened on column 16. The nuts within housings 52 are rotated by motor 54 through shafts 56. The operation of jackscrews 50 moves carriage 30, frame 32 and platen 34 of assembly 28A into and out of abutment with the left hand face of steam chest 24.

The operation of machine 10 is generally as follows. Motors 46 are operated to move platens 34 within frames 32 by means of jackscrews 42 to a position corresponding to the desired thickness of the foam material board to be manufactured. That is, the platens 34 are drawn back from the leading edge of frames 32 facing steam chest 24 by an amount equal to the desired thickness of the board. Cavity forming assemblies 28A and 28B are then moved by jackscrews 50 so that their respective frames 32 abut steam chest 24. Filler guns 22 then fill the mold cavities 12A and 12B with pre-expanded polystyrene beads from hoppers 20. Steam is then supplied to mold cavities 12A and 12B to expand the beads. After the steam cycles are complete, cooling water is supplied to steam chest 24, platen 34, and mold frame 32 to stabilize the expanded foam material.

When the molding cycle is complete, jackscrews 50 are retracted to move cavity forming assemblies 28A and 28B away from steam chest 24. Jackscrews 42 are then extended to move platens 34 along frames 32 to eject the finished foam boards from mold cavities 12A and 12B. The above described process is then repeated.

THE MAIN SUPPORTING FRAME

Figure 2:
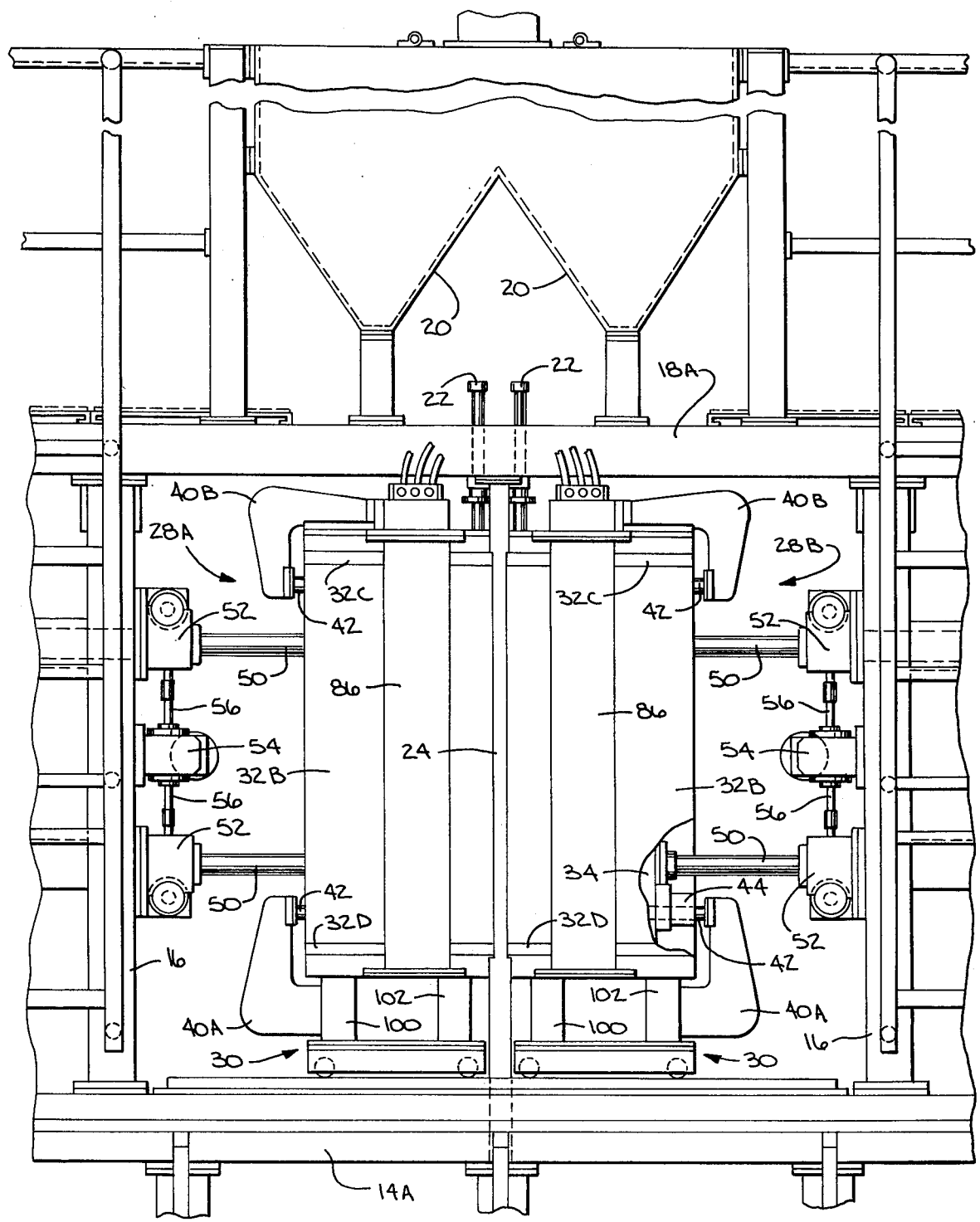
FIG. 2 is a detailed side view of the improved machine.
Figure 3:
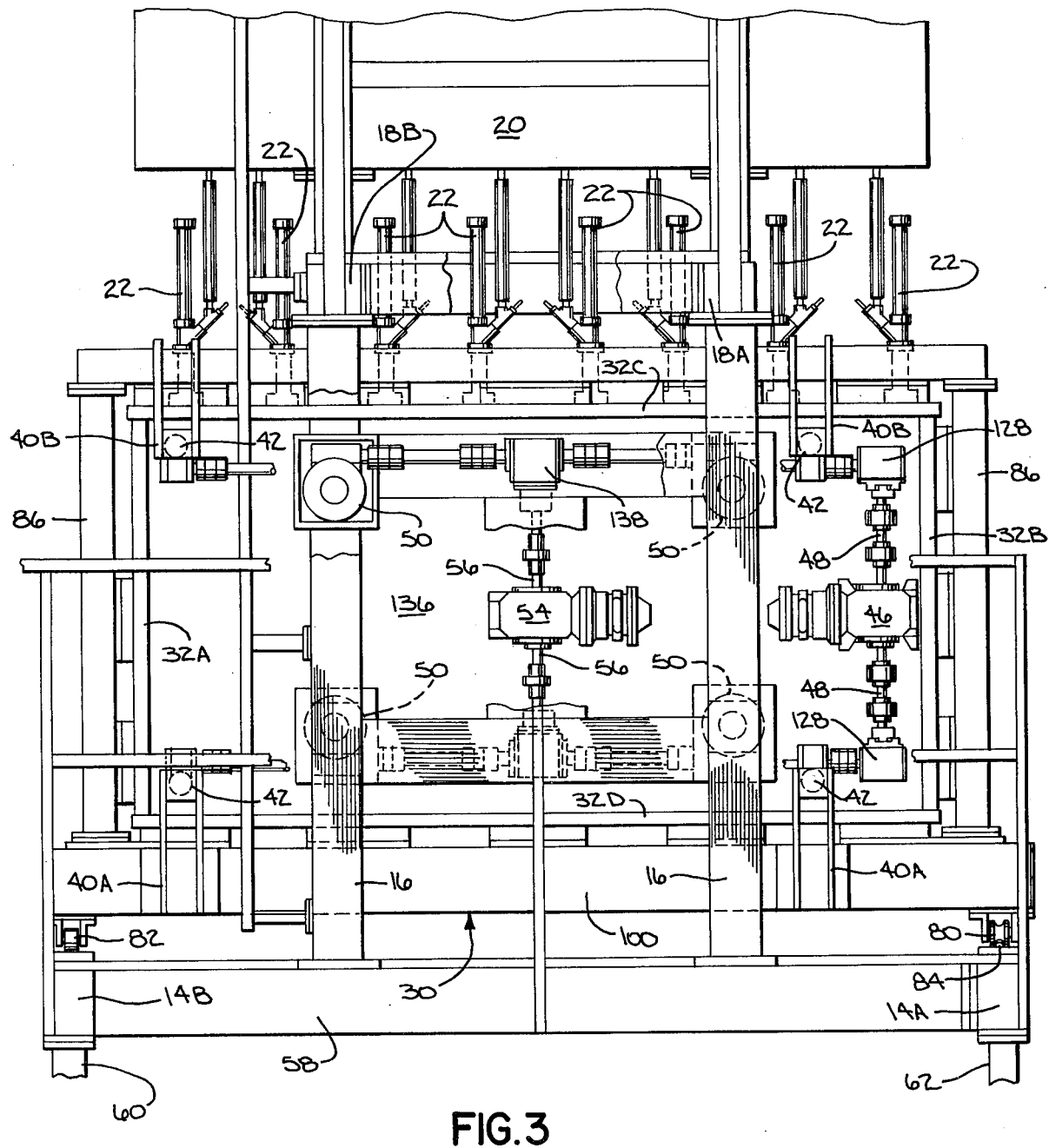
FIG. 3 is a detailed end view of the machine.

Turning now to FIGS. 2 and 3, foam board machine 10 of the present invention is shown in detail. FIG. 3 shows lower longitudinal members 14A and 14B as well as a transverse member 58 which interconnects members 14A and 14B of the lower supporting frame. If bottom discharge of the foam board from machine 10 is desired, members 14 and 16 may be mounted on posts 60 and 62 to raise machine 10 above a discharge conveyor. If side discharge of the foam boards is desired, frame members 14A, 14B, and 58 may be mounted directly on the floor of the work area.

Columns 16 are mounted on lower transverse members 58 to position a superstructure consisting of an upper frame having spaced upper longitudinal members 18A and 18B and the associated transverse members. These members support bins 20 containing pre-expanded polystyrene beads for supply to machine 10 through metering devices, such as conventional air-operated fill guns 22.

THE COMMON STEAM CHEST

Steam chest 24 is shown in detail in FIGS. 4 and 5. As shown in FIG. 5, steam chest 24 is suspended from upper longitudinal members 18 by L-shaped brackets 70. Steam chest 24 is supported on lower longitudinal members 14 by L-shaped brackets 72. To accommodate the vertical expansion of steam chest 24 when it is heated with steam, bracket 72 contains slots 74 for accommodating a keying projection in members 14. To accommodate lateral expansion of steam chest 24, brackets 70 are mounted in grooves 76 in blocks 78 on frame members 18.

Steam chest 24 comprises a pair of spaced plates 90 and 92 containing holes 26 through which the water and steam can pass. Holes 26 may be less than 1/16th inch in diameter. Holes 26 are typically drilled on one inch centers across plates 90 and 92.

Plates 90 and 92 are joined at the top to upper member 94 that forms an inlet manifold to steam chest 24. Plates 90 and 92 are joined at their bottoms to lower member 96 that forms a discharge manifold for steam chest 24.

Vertical bars 98 between plates 90 and 92 insure the structural integrity of chest 24. Bars 98 prevent the steam chest 24 from collapsing due to positive or negative forces on the plates 90 and 92 during the molding process. They also serve to reduce the area of loading by forming solid sections throughout the steam chest.

THE CAVITY FORMING ASSEMBLIES

Machine 10 includes two cavity forming assemblies 28A and 28B that are movable into engagement with opposite faces of common steam chest 24 to form the molding cavities or chambers 12A and 12B in which the polystyrene beads may be expanded into a board of foam material. One assembly 28A or 28B coacts with each side of the common steam chest 24. As the construction associated with each of the assemblies 28A and 28B is the same, only that associated with member 28A is described in detail below.

Assembly 28A includes a carriage 30 which supports mold frame 32 thereabove to allow vertical thermal expansion for frame 32. Carriage 30 is mounted on members 14A and 14B for movement toward and away from common steam chest 24. For this purpose, carriage 30 includes rollers 80 and 82 running on members 14A and 14B, as shown in FIG. 3. One set of rollers 80 may be grooved to coact with a rail 84 mounted on member 14A to maintain the machine components in registry. The other set of rollers 82, running on member 14B may be flat or smooth to accommodate lateral thermal expansion and contraction of mold frame 32.

Figure 11:
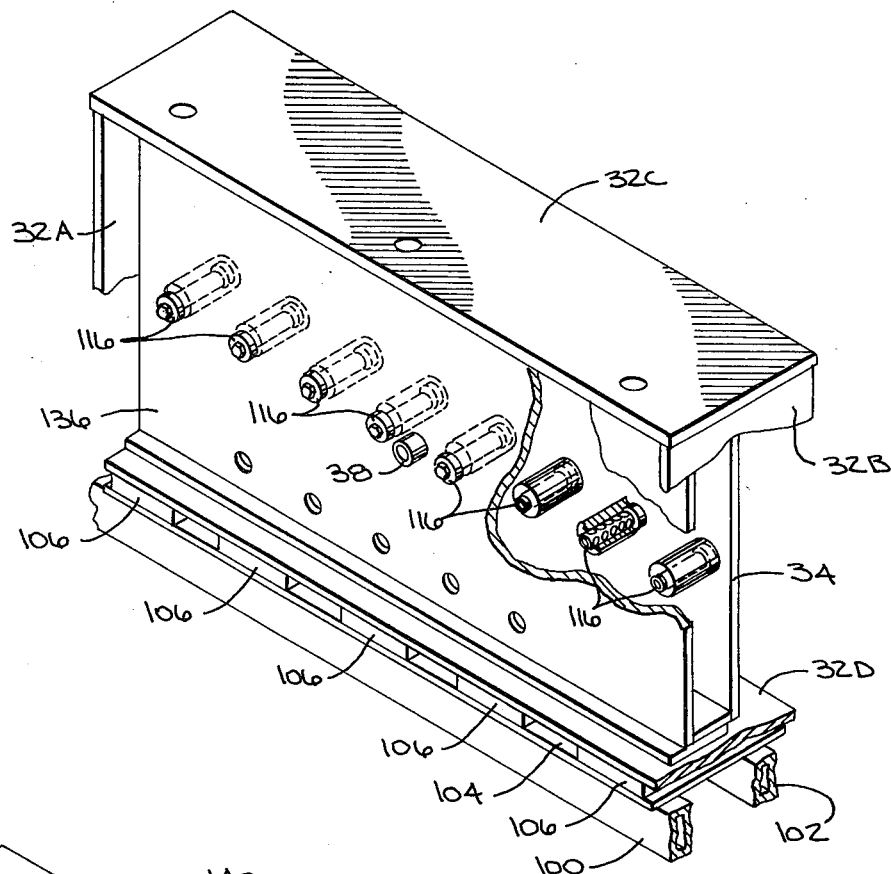
FIG. 11 is a fragmentary perspective view with parts broken away of the platen of the present invention.
Figure 12:
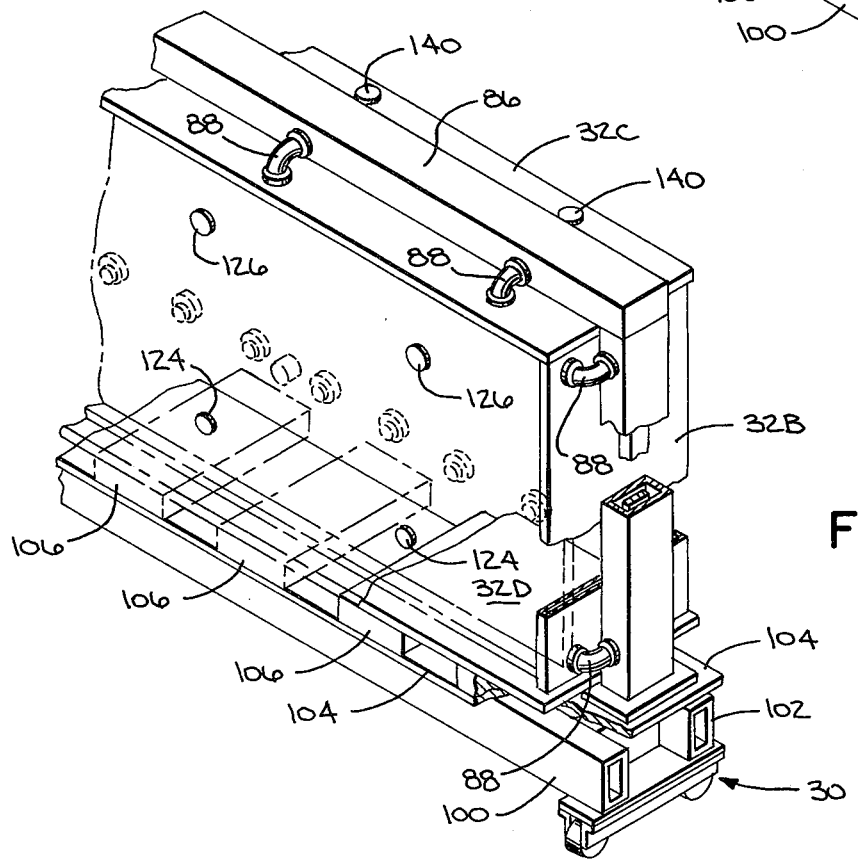
FIG. 12 is a fragmentary perspective view with parts broken away showing the mold frame and its associated carriage.

As shown most clearly in FIGS. 11 and 12, carriage 30 includes a pair of horizontally spaced beams 100 and 102 supporting a flat plate 104 and a plurality of spaced aluminum blocks 106 along plate 104. A U-shaped manifold 86 is mounted to plate 104, as best shown in FIGS. 2, 3 and 12. Manifold 86 functions as an inlet to distribute steam or water through tubes 88 to the mold frame 32, and beam 102 functions as an outlet for the steam or water.

Mold frame 32 includes four walls 32A–32D forming a rectangular shaped member with the bottom wall 32D mounted on plate 104 and its top 32C and side walls 32A and 32B surrounded by manifold 86. The walls of frame 32 includes inner and outer spaced plates which form a chamber to permit the supply of steam or water to surround the mold cavity 12A. A plurality of holes 108 in the sides of frame 32 discharge the steam or water directly into contact with the foam material within cavity 12A.

Figure 8:
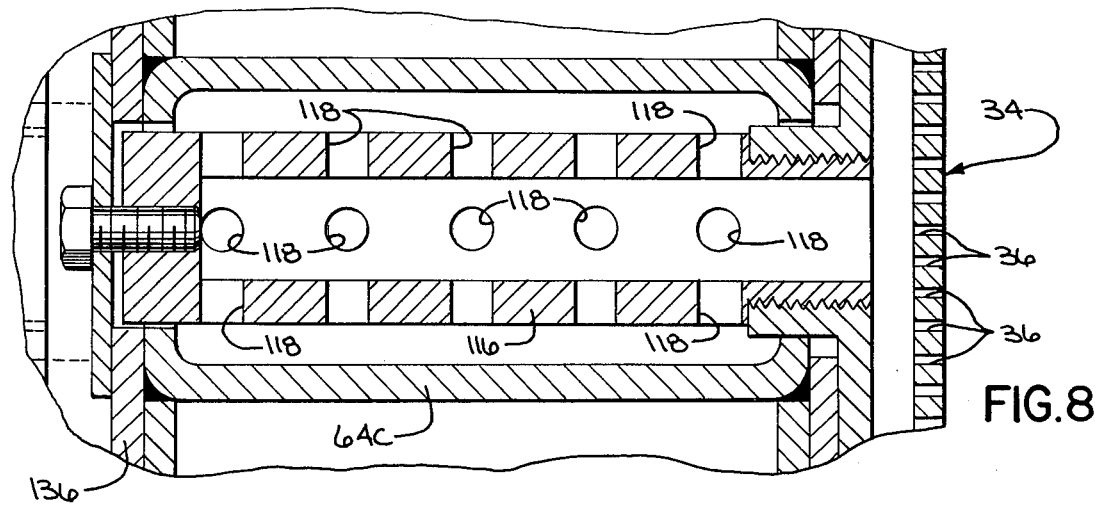
FIG. 8 is an enlarged fragmentary view in cross section of the steam and water supply for the platen shown in FIG. 6.

Platen assembly 110 includes hollow platen 34 formed by spaced inner and outer walls. The inner wall contains the holes 36 which are similar to holes 26 and 108, as best seen in FIG. 6. Horizontal hollow members 64A, 64B, 64C, 64D and 64E support platen 34. Central member 64C serves as a steam and water manifold for platen 34, and includes a plurality of horizontally spaced pipes 116 which extend from the space between the inner and outer walls of platen 34 into member 64C, as shown in FIG. 11 and in detail in FIG. 8. Each pipe 116 contains perforations 118 that permit steam or water in member 64C to enter the pipes 116 and the space between the inner and outer walls of platen 34. As shown in FIG. 6, platen 34 is spaced from mold frame 32 by clearance 120 that accommodates thermal expansion.

Figure 7:
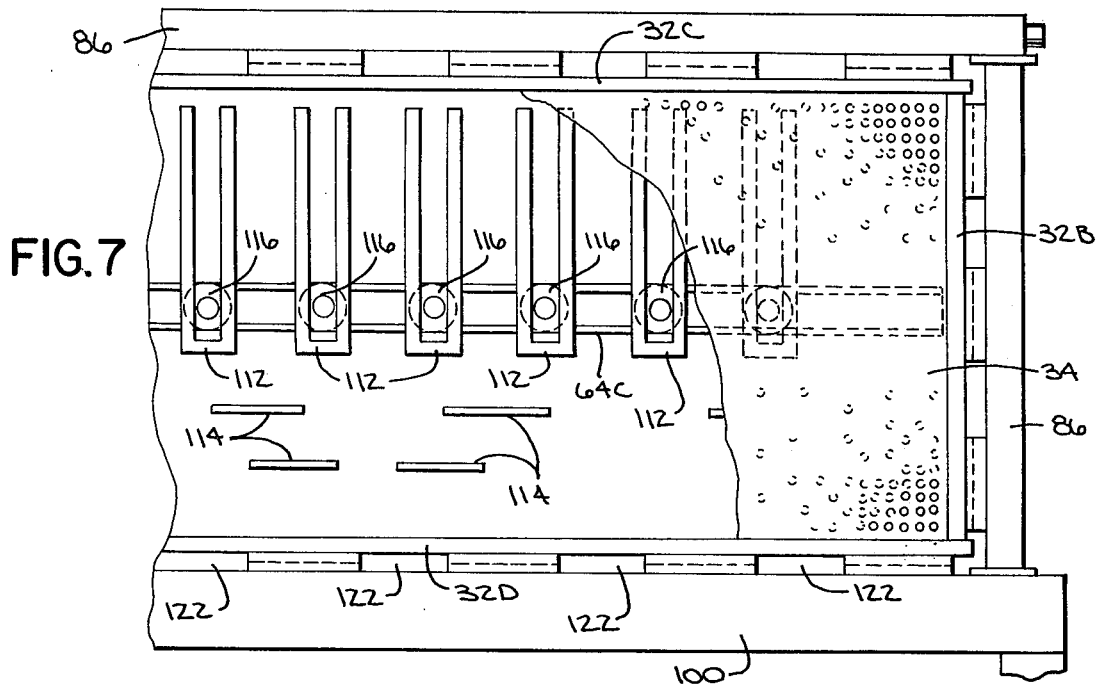
FIG. 7 is a fragmentary view with parts broken away of the face of the platen showing the interior thereof.

FIG. 7 shows the internal configuration of platen 34. Between the inner and outer walls of platen 34, a plurality of U-shaped tubular diverter bars 112 open upwardly from pipes 116. This insures even distribution of the steam and water and prevents air pockets from forming in the corners of platen 34. Horizontal baffle plates 114 assist in the even distribution of the steam and water within platen 34 and through holes 36.

Bracket members 40A are both L-shaped with one leg affixed to carriage 30 and a second leg extending upwardly to oppose the rear side of platen 34. Bracket members 40B have one leg affixed to mold frame 32 and manifold 106 and a second leg extending downwardly to oppose the rear side of platen 34.

Jackscrews 42 are interposed between L-shaped brackets 40A and 40B, respectively, and platens 34 to move the platens 34 within frames 32 and set the depth of mold cavities 12A and 12B, and hence the thickness of the foamed material board. To this end screws 42 abut the ends of the legs of L-shaped bracket members 40A and 40B. Housings 44, containing rotatable nuts (not shown) embracing the screws 42 are mounted on members 64A and 64E. Shafts 48 and gear boxes 128 rotate the nuts in housing 44 by means of motor 46 to extend or retract the screws 42 and move the platen 34 toward and away from steam chest 24 within frame 34. Motor 46 is mounted on the rear of platen assembly 110.

Figure 9:
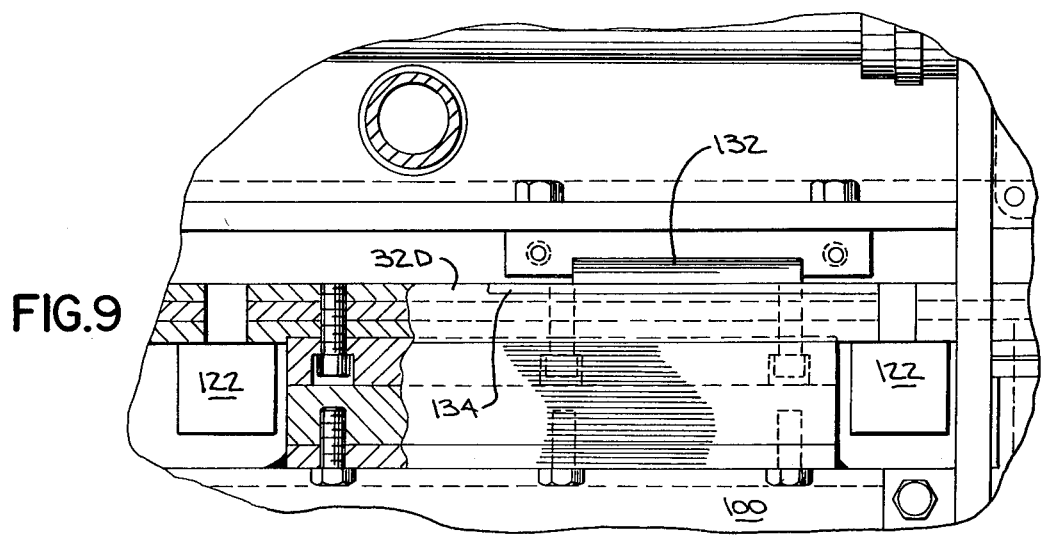
FIG. 9 is a fragmentary view with parts broken away and in section showing the bearings for the movable platen of the machine.

The movement of platen assembly 110 within frame 34 may be facilitated by an air bearing 130 on which platen 34 rests. Motor 46 may be an air motor coupled to the same air supply as air bearing 130. If the air supply to air bearing 130 fails, the air supply to air motor 46 will also fail. This feature avoids overloading motor 46 in an effort to move platen 34 without the aid of air bearing 130. In addition to air bearing 130, a roller bearing 132 is provided between platen assembly 110 and plate 104 to permit limited movement of the platen assembly 110 in the event the air supply fails, as for example to clear machine 10 of a board in the molding cavity. Bearing 132 rolls on a hardened plate 134 mounted in wall 32D, as seen best in FIG. 9.

Cavity forming assemblies 28A and 28B are moved toward and away from common steam chest 24 by an additional set of jackscrews 50 that extend between columns 16 and platen 34. Screws 50 abut plate 136 mounted on the rear of members 64A-64E, and extend to housing 52 containing rotatable nuts driven by shafts 56, gearboxes 138 and motor 54.

As noted previously, the configuration of cavity forming assembly 28B on the right side of common steam chest 24 is similar in construction to the cavity forming assembly 28A described in detail above.

OPERATION

In operation, motor 46 is operated to move platen 34 within mold frame 32 to a position spaced from the leading edge of frame 32 corresponding to the desired thickness of the foam material board by means of jackscrews 42. Cavity forming members 28A and 28B are then moved by jackscrews 50 so that the leading edges of frames 32 are in abutment with the opposite faces of common steam chest 24. Filler guns 22 are then operated to fill cavities 12A and 12B formed by platens 34, mold frames 32, and common steam chest 24 with pre-expanded polystyrene beads. The beads have been pre-expanded by a pre-expander (not shown) to a density which is less than the desired density of the finished board or sheet.

After the mold cavities 12A and 12B are filled, a load sensor 122 in the bottom wall of each mold frame 32 will sense the weight in pounds of the beads in the mold cavities 12A and 12B. Since the desired volume of the finished board is known, it is a simple calculation to compute the additional volume that is necessary in order for each cavity 12A and 12B to provide a finished board of the desired density. For example, if one is to make a 4'×8'33 6" sheet of expanded polystyrene of 4 lb. density, the mold cavity must contain 64 lbs. of prepuff material. This computation may be made manually by the machine operator or through a microprocessor utilizing a silicone chip. Once the new volume required has been calculated, the platen 36 is moved away from steam chest 24 to provide the necessary additional volume. Thus, the dimensions of cavities 12A and 12B are adjusted to provide a volume which will correspond to the desired density of the finished board. The cavities 12A and 12B are then filled by introducing additional pre-expanded beads. Note, however, that at this point although the density of the finished board would be as desired, the dimensions of the finished board would not be as desired but instead would be greater than that desired since platen 36 has been moved away from its original position with respect to steam chest 24.

Steam is then supplied to mold cavities 12A and 12B via steam chest 24, platen 34 and mold frame 32 to further expand the beads. In a typical operation, steam is first supplied to each cavity from one side, as for example through holes 26 in steam chest 24 while maintaining a vacuum on the opposite side of the cavity in platen 34, then steam is supplied from the other side, as through holes 36 in platen 34 while maintaining a vacuum on the other side of the cavity in steam chest 24, and finally supplying steam from both sides. The single side steam supply may last for about 10 seconds each while the double side steam supply may last for about 20 seconds. The steam heats the beads to further expand the beads into a fusable foamed state within cavities 12A and 12B. As the steam is initially supplied, the drains to steam chest 24, platen 34, and mold frame 32 remain open for a short period of time so that entrapped air may be forced out to avoid air pockets that would prevent uniform heating of the beads.

While the beads are in their heated fusable foamed state, they are squeezed to the predetermined thickness dimension desired to fuse the beads into an integral foamed mass. This squeezing step is performed by activating jackscrews 42 to move platen 34 toward steam chest 24. Platen 34 is moved back to the position it originally had prior to the initial filling of cavities 12A and 12B, that is, back to the desired volume and dimensions for the finished board. This squeezing by platen 34 not only provides a finished board of the desired dimensions and density, but also provides the board with a thicker "skin". Typically, this skin may be up to about 1 inch thick in contrast to a skin of about 1/32 inch in prior art boards. Thus, a board is provided that will not readily absorb moisture and will not readily deform under compression due to its thicker skin.

After the steam and squeezing cycles are complete, cooling water is supplied to mold cavities 12A and 12B via steam chest 24, platen 34 and mold frame 32 to stabilize or cure the mass of expanded foam material and form the finished board. Heat sensors 124 and pressure sensors 126 are provided in steam chest 24, platen 34 and mold frame 32 to determine the optimum cooling cycle time. When the temperature sensors 124 indicate that the cooling water temperature has risen a predetermined amount, as for example 30° F., the drains are opened and the existing cooling water is drained away. The drains are then closed and a vacuum is connected to platen 34, steam chest 24 and mold frame 32. The vacuum draws heat from the foamed mass in cavities 12A and 12B to once again heat the aluminum platen 34, steam chest 24, and mold frame 32. Additional temperature sensors 140 sense the rise in temperature of these components and if the temperature rises above a predetermined value, cooling water is once again supplied to mold cavities 12A and 12B. The cooling cycle is repeated until the temperature sensors 124 and 140 indicate little or no transient increase in temperature.

Pressure sensors 126 are provided in the center of platen 34 and steam chest 24 to avoid post-expansion bloating problems of the finished board. The cavities 12A and 12B will not be opened until sensors 126 indicate that the release of pentane or other blowing agent has subsided indicating a stable board.

When the molding cycle is complete, the finished boards may be ejected from the mold cavities 12A and 12B. In order to accomplish this, jackscrews 50 are retracted to move cavity forming assemblies 28A and 28B away from steam chest 24. Jackscrews 42 are then extended to move platens 34 along frames 32 to eject the foam boards from mold cavities 12A and 12B. Ejection may be either out the side or out the bottom of machine 10. The above described molding process is then repeated.

The present invention thus provides an improved apparatus and method for obtaining rapid production of high quality foam boards. While the invention has been specifically described using polystyrene beads containing n-pentane blowing agent, these are but preferred materials. Other foamable particulate polymer material which may be used includes other homopolymers and copolymers derived from vinyl monomers such as vinyl chloride, divinyl benzene, alpha-methylstyrene, nuclear dimethylstyrene, and vinyl naphthylene. In addition to the polystyrene homopolymers, copolymers of polystyrene with alpha-methylstyrene, divinyl benzene, butadiene, isobutylene and acrylonitrile having about 50% or more styrene are especially suitable. Useful blowing agents include other volatile aliphatic or cyclo-aliphatic hydrocarbons, generally having from 1 to 7 carbon atoms per molecule. These include methane, ethane, propane, butane, hexane, petroleum ethers, cyclopentane, cyclohexane, cyclopentadiene, and halogenated derivatives which have boiling points below the softening point of the polymers. Others include dichloroethylene, dichlorodifluoromethane, acetone, methanol, methyl acetate, ethyl acetate, methyl formate, ethyl formate, propionaldehyde, dipropyl ether. The expanding agent is generally present in amounts of from 3% to 15% of polymers with from 5 to 8% being preferred.

Various modes of carrying out the invention are contemplated as being within the scope of the following claims particularly pointing out and distinctly claiming the subject matter which is regarded as the invention.

I claim:

1. A machine for molding sheets of foamed material, comprising:
   an upright stationary steam chest having means for discharging fluids along one face thereof;
   a movable mold frame extending normal to the face of said steam chest and abuttable therewith;
   a platen movably mounted within the mold frame and positioned in opposition to said steam chest, said platen having means for discharging fluid along a face thereof disposed in opposition to the face of said steam chest, said platen cooperating with said steam chest and mold frame to define a mold cavity;
   means coupling said platen to said mold frame for moving said platen relative to said mold frame toward and away from the stationary steam chest; and
   means for moving said mold frame into and out of abutment with said steam chest.

2. The molding machine of claim 1, further including main support means having upper and lower spaced supporting frames, and abutment means interconnecting said supporting frames; and said steam chest extends between and is affixed to said supporting frames.

3. The molding machine of claim 2, further including a carriage having roller means for movably supporting said mold frame on the lower supporting frame of said main support means.

4. The molding machine of claim 1, wherein said coupling means includes a bracket member having one leg affixed to said mold frame and its other leg opposing the outer face of said platen, and jackscrew means extending between said other leg and said platen operable to move said platen with respect to said mold frame.

5. The molding machine of claim 2, wherein the means for moving said mold frame includes jackscrew means interposed between said abutment means and said movable platen.

6. The molding machine of claim 1, wherein said movable platen includes spaced inner and outer walls forming a chamber therebetween, inlet fluid means, outlet fluid means, and fluid diverter means connected to said fluid inlet means for directing fluid entering said chamber in an upward direction to eliminate the formation of air pockets in said chamber.

7. The molding machine of claim 6, wherein said diverter means includes a plurality of U-shaped tubular members having the open ends of their legs positioned closely adjacent to the top of said platen.

8. A machine for molding sheets of foamed material, comprising:
   main support means having upper and lower spaced supporting frames and abutment means extending generally normal thereto interconnecting said supporting frames;
   an upright stationary steam chest centrally located with respect to said support frames and extending therebetween, said chest having means for discharging fluids along a pair of opposed external faces thereof; and
   a cavity forming means abuttable with each of the opposed external faces of said steam chest, each of said cavity forming means including:

mold frame means extending normal to one of the external faces of said steam chest;

a platen movably positioned within said mold frame generally parallel to said one face of said steam chest, said platen having means for discharging fluids along the surface thereof;

first jackscrew means coupling said platen to said mold frame means for moving said platen relative to said mold frame means toward and away from the stationary steam chest; and second jackscrew means interposed between said abutment means and said platen for moving the mold frame means into and out of abutment with said steam chest.

9. The molding machine of claim 8, further including a carriage having roller means for movably supporting said mold frame means on the lower supporting frame of said main support means.

* * * * *